UNITED STATES PATENT OFFICE.

MELKON LAVON ARAKELIAN, OF NEW YORK, N. Y.

FERMENTED MILK FOOD AND METHOD OF PRESERVING SAME.

SPECIFICATION forming part of Reissued Letters Patent No. 11,691, dated September 13, 1898.

Original No. 580,541, dated April 13, 1897. Application for reissue filed May 14, 1898. Serial No. 680,758.

*To all whom it may concern:*

Be it known that I, MELKON LAVON ARAKELIAN, a citizen of the United States, residing at New York, in the county and State of New York, have invented certain new and useful Improvements in Fermented Milk Foods and Methods of Preserving Same; and I do hereby declare that the following is a clear and exact description of the invention, which will enable others skilled in the art to which it appertains to make and use the same.

Heretofore fermented milk foods have been used, and also have been placed upon the market, such as kafir, kumiss, matzoon, and labban, which have met with a limited success.

The object of this invention is to produce a semisolid thick fluid which is very palatable, easily digestible, and wholly nutritious, and a more permanent article of diet for infants, valids, and invalids, especially for those having impaired digestive organs, and especially adaptable for dyspepsia, gastritis, and inflammatory condition of the alimentary canal.

I have combined in my compound proteids, carbohdydrates, and lactic acid in such form and under such conditions that it is easily preserved. This might be termed a soluble nutritious "blanc-mange," containing nutritious lactic acid. It is made by stirring six ounces of starch in eight ounces of milk, boiling or sterilizing the remaining portion of the twelve pints of milk, and adding the first while boiling, and continuing about fifteen minutes. This is then evaporated to about one to two thirds ($\frac{1}{3}$ to $\frac{2}{3}$) in a water-bath with stirring. From one-half to one ounce of cane-sugar is then added and the mixture removed from the fire and to a porcelain-lined vessel, and when it falls to 130° to 134° Fahrenheit twelve ounces of concentrated labban is added. The mixture is then covered with a cosy and allowed to remain about six hours at 80° to 90° Fahrenheit, or for about twelve hours if at 50° to 60° Fahrenheit. It is then stirred, cooled to 33° to 35° Fahrenheit, strained, and filled in tin preserving-cans, which are then sealed.

The proportions which I have found best are: pure fresh milk, twelve pints; pure starch, six to twelve ounces; sugar, one-half to one ounce; condensed or sterilized labban, twelve ounces, and these are united as above stated.

Heretofore labban and blanc-mange were separately made, but the former is less nutritious than when combined with starch, and the latter, being prepared with no fermentation, is less soluble than my preparation and, being less easily absorbed, is therefore less nutritious. Patients who dislike starchy foods will accept this preparation, which has a specially agreeable taste somewhat similar to labban, but more rich than that. The lactic acid which it contains is the result of fermentation and is well known as an aid to digestion.

Having fully described my invention, what I claim, and desire to secure by Letters Patent, is—

1. The hereinbefore-described preparation of fermented milk food, composed of milk, starch, sugar, and sterilized labban, containing lactic acid as the result of fermentation, substantially as and for the purpose described.

2. The process of preparing fermented milk foods and method of preserving same, which consists in the addition of starch to boiling milk evaporating the mixture in a water-bath to about one to two-thirds, adding cane-sugar, reducing to about 130° Fahrenheit, adding labban thereto, and keeping the same at a temperature of about 50° to 90° Fahrenheit, then cooling and straining and preserving the same, substantially as set forth.

Signed at New York city, in the county of New York and State of New York, this 13th day of May, A. D. 1898.

MELKON LAVON ARAKELIAN.

Witnesses:

PATRICK J. CONROY,

CHAS. O. C. CASSIDY.